United States Patent
Datta et al.

(10) Patent No.: US 9,071,596 B2
(45) Date of Patent: Jun. 30, 2015

(54) SECURELY ESTABLISHING A COMMUNICATION CHANNEL BETWEEN A SWITCH AND A NETWORK-BASED APPLICATION USING A UNIQUE IDENTIFIER FOR THE NETWORK-BASED APPLICATION

(75) Inventors: Kaushik Datta, Bangalore (IN); Craig Joseph Mills, Davis, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 137 days.

(21) Appl. No.: 13/562,190

(22) Filed: Jul. 30, 2012

(65) Prior Publication Data

US 2014/0032897 A1    Jan. 30, 2014

(51) Int. Cl.
  *H04L 29/06*    (2006.01)
(52) U.S. Cl.
  CPC .................................. *H04L 63/0823* (2013.01)
(58) Field of Classification Search
  CPC ......................... H04L 63/0823; G06F 21/33
  See application file for complete search history.

(56) References Cited

U.S. PATENT DOCUMENTS

| | | | |
|---|---|---|---|
| 7,242,676 B2 | 7/2007 | Rao et al. | |
| 7,623,846 B2 | 11/2009 | Hybre et al. | |
| 7,917,124 B2 | 3/2011 | D'Angelo et al. | |
| 2007/0067385 A1* | 3/2007 | D'Angelo et al. | 709/203 |
| 2009/0100176 A1* | 4/2009 | Hicks et al. | 709/224 |
| 2009/0138946 A1* | 5/2009 | Schneider et al. | 726/5 |
| 2011/0289560 A1 | 11/2011 | Laitinen et al. | |
| 2012/0210436 A1* | 8/2012 | Rouse | 726/26 |

FOREIGN PATENT DOCUMENTS

CN    101917700 A    12/2010

OTHER PUBLICATIONS

Unknown, "appl_id—Application ID monitor element," available at URL < http://publib.boulder.ibm.com/infocenter/db2luw/v8/index.jsp?topic=/com.ibm.db2.udb.doc/admin/r0001166.htm > website, accessed Jul. 26, 2012.

* cited by examiner

*Primary Examiner* — Izunna Okeke
(74) *Attorney, Agent, or Firm* — Mahamedi, Paradice, Kreisman

(57) ABSTRACT

A network-based application can establish a secure network connection to a switch. A unique identifier (UID) is generated for the network-based application, and a secure authentication request is generated from the network-based application. The UID for the network-based application is embedded in the secure authentication request. The secure authentication request is communicated to the switch. A response to the secure authentication request is received from the switch. One or more operations are performed that utilize the UID to establish a secure communication channel between the network-based application and the switch.

20 Claims, 4 Drawing Sheets

SECURELY ESTABLISHING A COMMUNICATION CHANNEL BETWEEN A SWITCH AND A NETWORK-BASED APPLICATION USING A UNIQUE IDENTIFIER FOR THE NETWORK-BASED APPLICATION

BACKGROUND

Server-based platforms now include virtualized and non-virtualized environments on which network-based applications can be executed. Such network-based applications typically require use of network resources, such as network services. The server-based platforms also typically use network switches to enable or make services and other resources available to entities such as the network-based applications.

DETAILED DESCRIPTION

Figure 1:
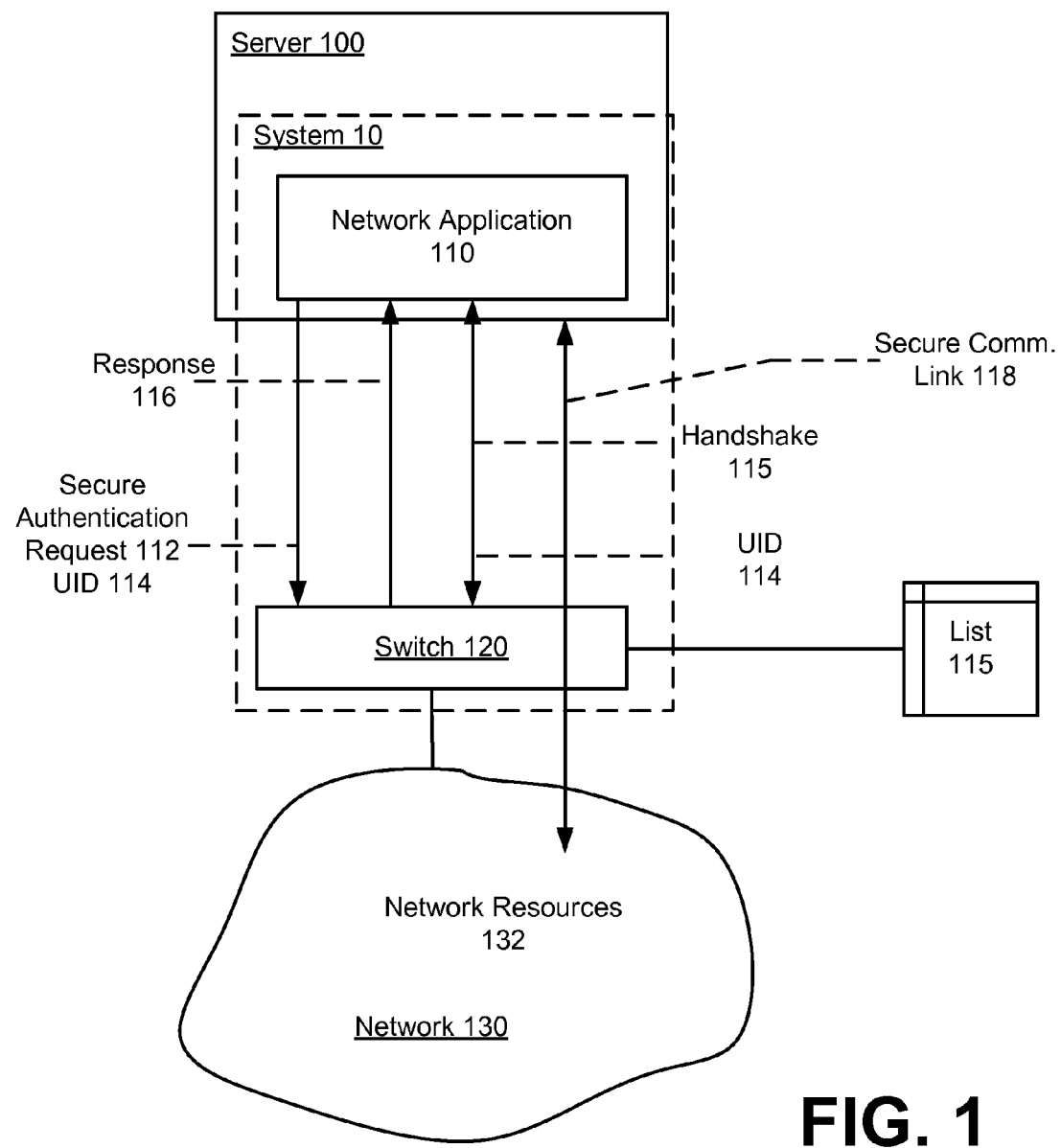
FIG. 1 illustrates an example system for establishing a secure communication channel between a network-based application and a switch.

Examples described herein provide for a network-based application that can be uniquely identified by a switch in order to securely provide network resources or services to the application. Still further, examples described herein uniquely identify a network-based application while establishing a secure services communication channel between the application and a switch.

In some examples described herein, a network-based application can establish a secure network connection to a switch. A unique identifier (UID) is generated for the network-based application, and a secure authentication request is generated from the network-based application. The UID for the network-based application is embedded in the secure authentication request. The secure authentication request is communicated to the switch. A response to the secure authentication request is received from the switch. One or more operations are performed that utilize the UID to establish a secure communication channel between the network-based application and the switch.

In a variation, a switch receives a secure authentication request from a network-based application. The secure authentication request is parsed to determine the UID for the network-based application. The UID is recorded as being associated with the network-based application. A response to the secure authentication request is sent to network-based the application with the UID. One or more operations are performed to establish a secure communication channel with the network-based application using the UID.

In still another variation, a system is provided that includes a switch and a network-based application. A network-based application may be provided by a server. The network-based application operates to generate a UID for the application. The network-based application also generates a secure authentication request for the switch. The secure authentication request embeds the unique identifier for the application in the secure authentication request. The switch receives the secure authentication request, and parses the secure authentication request to determine the unique identifier for the application. The unique identifier is recorded as being associated with the application. A response is sent to the network-based application. The switch and network-based application then operate to establish a second secure communication channel using the UID of the network-based application. The network-based application and the switch perform operations to establish a secure network connection for enabling the network-based application to receive resources or services through the switch.

More generally, examples described herein provide a secure Transmission Control Protocol (TCP) network based services infrastructure that provides for identifying a network-based application by unique identifier, then determining what resources can be accessed by the identified application based on the unique identifier.

Among other accomplishments, examples described herein provide for uniquely identifying network-based applications (and connections for such applications), including those which are subscribing to TCP/IP network based services. The network-based applications can run on either virtualized or non-virtualized server platforms. Moreover, according to some examples, a network-based application is provided a secure and trusted channel with a service provider on a network. The network-based channel can be uniquely and securely identified for purpose of receiving services and resources from a network.

In some embodiments, the programmatic act of identifying a network-based application is combined with the programmatic act of providing an authenticated and encrypted channel on which a network service is provided.

In examples described herein, a certificate signing process is used (e.g., as provided under a Secure Socket Layer (SSL) protocol). The network-based application embeds a unique application identifier (UID) in a Certificate Service Request ("CSR"), and the embedded UID is subsequently used by a switch to associate the application with services or resources on a network. A provisioned CSR with the embedded UID can subsequently be used to provide software services and resources made available through the switch to the application.

Furthermore, in some embodiments, an administrator for the service provider can set policies based on the network-based application and the corresponding UID. The policies can regulate what resources specific applications can access based on the UID of that application.

System Diagram

FIG. 1 illustrates an example system for establishing a secure communication channel between a network-based application and a switch. In examples described herein, a system 10 includes a switch 120 and one or more network-based applications 110. The switch 120 is able to uniquely identify the network-based application 110 when that application makes a request for network services 132 from the switch. Based on the unique identification, the switch 120 establishes a secure communication channel with the network-based application 110, and enables the application to receive services from a resource 132 on a network 130.

In an example, the network-based application 110 operates on a server 100. In one implementation, the server 100 is a virtual machine, such as an X86 type virtual machine. In other implementations, the server 100 is a physical server, such as a blade server (e.g., manufactured under the tradename of HP PROLIANT or HP INTEGRITY, by the Hewlett-Packard Company). The network-based application 110 can be one of multiple applications that reside with or are otherwise provided by the server 100. As an addition or alternative, the network-based application 110 can be one of multiple applications that access the network 130 and resources provided therein through the switch 120.

As an example, the network-based application 110 can provide one or more services using a resource 132 provided on the network 130, and made available through the switch 120. Examples of services that can be provided by the network-based application 110 include, for example, virtual server host platforms, remote desktop or workstations, file sharing, web page serving and caching, and streaming audio and video content.

The switch 120 can operate to control access to resources 132 of the network 130, including limiting access to portions of resource 132 based on, for example, network administrator input. In a network environment (e.g., enterprise network), the switch 120 can, for example, correspond to a wired data switch which exports and advertises networking services over the TCP/IP networking layer.

In operation, network-based application 110 generates a unique identifier (UID) 114, and communicates the identifier to the network switch 120 in a manner that enables the switch to subsequently authenticate the network-based application. In one example, the UID 114 is generated at a first instance in which the network based application 110 requires use of network resource 132 via the network switch 120. For example, the network-based application 110 can generate the UID 114 when the server 100 is first booted up and running on a network that requires use of the switch 120.

The network-based application 110 communicates a secure authentication request 112 using, for example, a certificate signing process provided under the SSL protocol. The secure authentication request 112 can embed the UID 114 in a manner that enables the UID 114 to be extractable by the receiving entity.

In the example provided, the network switch 120 receives the secure authentication request 112, and extracts or otherwise identifies the UID 114 from the request. For example, the secure authentication request 112 can be parsed to identify the UID 114. The UID 114 can be recorded as part of a list 115, so as to be associated with the server 100 and/or network-based application 110. The list 115 can be maintained by a network administrator, who assigns or otherwise determines what resources or portions of resources on the network 130 that individual entities can access. Thus, the network-based application 110 can be pre-associated with resource 132. The switch 120 can use the UID 114 to grant the network-based application 110 access to the pre-associated resource 132.

The switch 120 generates a response 116 to the secure authentication request 114 that is provided to the network-based application 110. Upon receiving the response 116, the network-based application 110 initiates a process to establish the secure communication link 118. In one implementation, the secure communication link 118 can be established using, for example, SSL/TCP protocol. During a handshake 115 exchange provided for under the SSL exchange, the network-based application 110 communicates UID 114 to the switch 120. The switch 120 cross-reference to the UID 114 with the list 115 in order to determine what resources or services are to be provided to the network-based application 110 in response to receiving the request from the application. Once the UID 114 is established and recorded with the switch 120, subsequent request from the network-based application 110 can be granted based on the existing UID 114.

Methodology

Figure 2A:
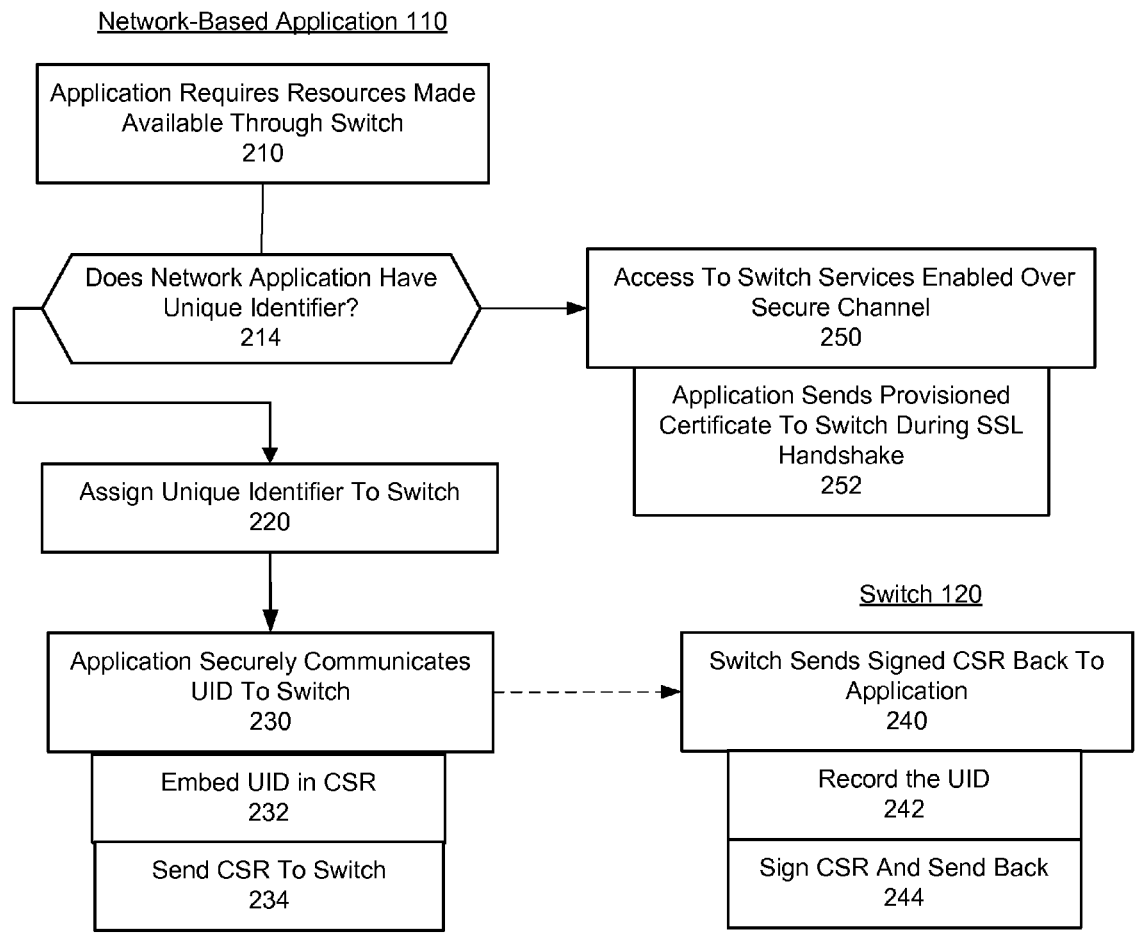
FIG. 2A illustrates an example method for assigning a unique identifier to a network-based application.
Figure 2B:
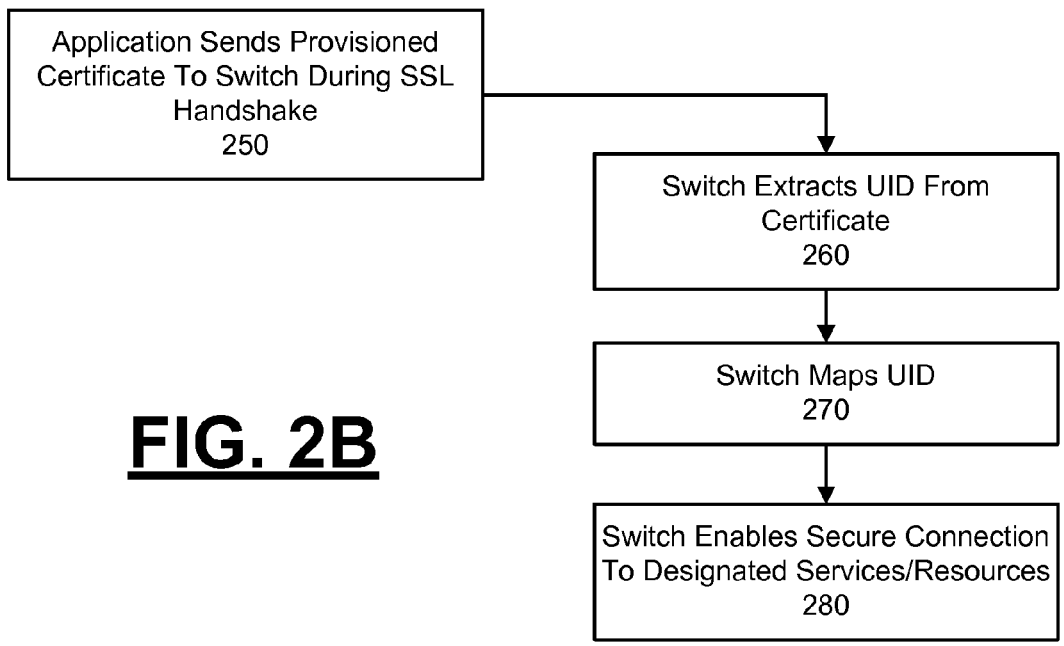
FIG. 2B illustrates an example method for a switch to utilize a unique identifier of a network-based application in order to provide services for the application.

FIG. 2A illustrates an example method for assigning a unique identifier to a network-based application. FIG. 2B illustrates an example method for a switch to utilize a unique identifier of a network-based application in order to provide services for the application. Examples such as described by FIG. 2A and FIG. 2B can be implemented using, for example, a system such as described with an example of FIG. 1. Accordingly, reference may be made to elements of FIG. 1 for purpose of illustrating suitable components for performing a step or sub-step being described.

In FIG. 2A, a network-based application 110 may require resources made available through the switch 120 (210). The switch 120 is configured to deny access to required resources on the network 130 unless the requesting application (i) includes a provisioned certificate, and (ii) can be mapped by UID 114 as to having access to the required resources. The network-based application 110 makes a determination as to whether the application has an assigned UID that has been communicated to the switch 120 (214).

If the determination is that the network-based application 110 has generated and communicated the UID 114 to the switch 120, then the application is able to access required resources (e.g., switch services) over the secure communication channel 118 (250). For example, the network-based application 110 can send a provisioned certificate under an SSL/TLS protocol to the switch with the UID 114 embedded in the communication and/or otherwise communicated during the handshaking process.

Else the network-based application 110 communicates a UID to the 120. In one example, the UID is a 36 byte unique which is generated at run time and is associated with the application during the application boot up. The network-based application 110 can include, for example, programming (e.g., received from the network switch 120) to generate the UID 114.

Once generated, the network-based application 110 securely communicates the UID to the switch 120 (230). In one example, a Secure Socket Layer/Transport Layer Security (SSL/TLS) security protocol is used in communications between the network-based application 110 and the switch 120. The SSL/TLS security protocol utilize a certificate signing process that provides for the network-based application to generate and communicate requests which authenticate the requesting entity. The network-based application 110 and the switch 120 can modify aspects of the data elements under the certificate signing process in order to enable initial communication of the UID 114 to the switch 120. Under the certificate signing process, the switch 120 can advertise services while possessing the capability to act as a Certificate of authority that can sign a Certificate Signing Request (CSR) for the requesting applications.

In one implementation, the network-based application 110 securely communicates the UID 114 from the network-based application 110 to the switch 120 by embedding the UID 114 in a field of the CSR (232). The CSR is sent to the switch (234) with the UID 114 of the requesting application being embedded. In one example, a common name tag in the certificate subject field of the CSR can be overloaded (under existing formats) to include the UID 114. In this format, the UID 114 can be provided as, for example, a 36 byte unique number. In this way, the network-based application 110 generates the CSR, embeds the UID 114 in the common name tag for the certificate subject field in the CSR, and sends the CSR with the overloaded fields containing the unique identifier 114 to the switch 120. The fact that the CSR itself is sent over a SSL connection secures the CSR from being accessed by malicious or unauthorized use.

The switch 120 can respond to the communication from the network-based application 110 (240) by (i) recording the UID 114 and the network-based application (242), and (ii) providing a response communication to the network-based application 110 that includes the UID 114. In response to receiving the CSR, the switch 120 signs the CSR and sends the signed CSR back to the network-based application 110 (244). The result is that the switch 120 first associates the UID 114 with the CSR sent by the network-based application 110, then subsequently associates the same UID with the certificate (or signed request).

In this way, the switch 120 can record the UID 114, and use the UID 114 to associate the network-based application 110 with resources or services that are available through the switch 120. For example, a network administrator can associate services or resources with the network-based application 110. Subsequently, if the determination of (214) is that the network-based application does have the unique identifier, then the network-based application can access the services made available through the switch 120 using a secure communication channel that authenticates the network-based application, and encrypts data exchanged with the application.

Once the network-based application 110 generates the UID and communicates it to the switch 120, the application is able to establish a secure communication channel (or a second connection) with the switch 120 using the provisioned certificate. With reference to FIG. 2B, the network-based application can, for example, send a provisioned certificate to the switch during the SSL handshake (250). As mentioned in an example of FIG. 2A, the provisioned certificate can embed the UID 114 of the network-based application 110. In this process, the switch extracts the UID 114 from the provisioned certificate (260). The switch 120 can store the UID 114 in a per connection specific software instance. The switch 120 associates the UID 114 with the SSL connection, and in turn with the network-based application 110. This ensures the switch 120 correctly identifies the network-based application 110.

In one implementation, the switch 120 maps the UID 114 to, for example, the SSL connection, and the resources or services that the particular network-based application 110 (270) is able to access. The switch 120 can then enable a secure (authenticated, encrypted) connection that enables the network-based application 110 to receive resources or services that are designated for the specific UID 114 (280). For example, the network-based application 110 can receive services that are indexed for the UID of the application.

A method such as described by examples of FIG. 2A and FIG. 2B can be implemented with multiple applications that require use of the switch 120. As a result, the switch 120 can provide secure application-specific services to multiple network-based applications. Even in a virtualized environment in which multiple network-based applications run on a machine, each application is provided a unique identifier that identifies that application to the switch 120 apart from other application. In turn, the switch 120 can securely provide application-specific services to the various applications using an authorized and encrypted data channel.

Hardware

Figure 3:
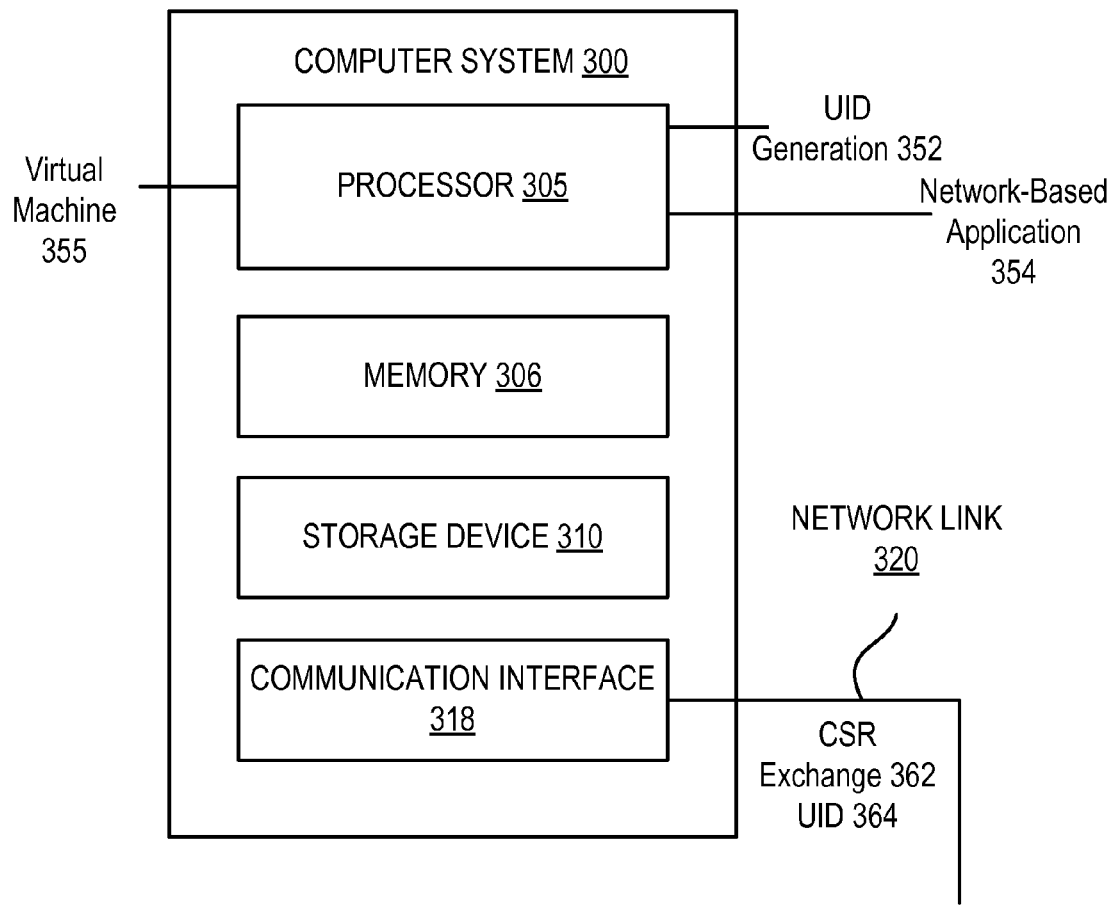
FIG. 3 illustrates an example computing system to implement functionality such as provided by various examples

FIG. 3 illustrates an example computing system to implement functionality such as provided by various examples, such as by an example system of FIG. 1 and/or an example method of FIG. 2A or FIG. 2B. For example, computing system 300 can be used to implement a physical or virtual server on which a network-based application 354 can be operated. In one implementation, computer system 300 includes at least one processor 305 for processing instructions. Computer system 300 also includes a memory 306, such as a random access memory (RAM) or other dynamic storage device, for storing information and instructions to be executed by processor 305. The memory 306 can include a persistent storage device, such as a magnetic disk or optical disk. The memory 306 can also include read-only-memory (ROM). The communication interface 318 enables the computer system 300 to communicate with one or more networks through use of the network link 320.

In one implementation, the memory 306 stores instructions, from which the processor 305 executes, in order to (i) implement server processes (e.g., physical server processes, virtual machine 355), (ii) operate one or more network-based applications, and (iii) implement processes and functionality such as described with a method of FIG. 2A, including UID generation for the network-based application. The communication interface 318 can be used to communicate with, for example, the switch 120 and with resources or services provided through the switch 120. The network link 320 can include a secure communication channel that is established, for example, using SSL/TLS. A UID output of the UID generation 352 can be communicated to the network switch 120 over the communication interface 318.

Examples described herein are related to the use of computer system 300 for implementing the techniques described herein. In one example, those techniques are performed by computer system 300 in response to processor 305 executing one or more sequences of one or more instructions contained in memory 306. Such instructions may be read into memory 306 from another machine-readable medium, such as a storage device. Execution of the sequences of instructions contained in main memory 306 causes processor 305 to perform the process steps described herein. In alternatives, hard-wired circuitry may be used in place of or in combination with software instructions to implement variations described herein. Thus, examples described are not limited to any specific combination of hardware circuitry and software.

Although illustrative examples have been described in detail herein with reference to the accompanying drawings, variations to specific examples and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A non-transitory computer-readable medium storing instructions, that when executed by one or more processors, cause the one or more processors to perform operations comprising:

generating a unique identifier (UID) for a network-based application;

generating, for the network-based application, a secure authentication request to a network switch;

embedding the UID for the network-based application in the secure authentication request;

communicating the secure authentication request to the network switch using a first secure connection;

receiving a provisioned certificate from the network switch via the first secure connection, wherein the provisioned certificate is provided by the network switch in response to the secure authentication request, wherein the provisioned certificate includes the UID; and establishing a second secure connection between the network-based application and the network switch using the provisioned certificate.

2. The non-transitory computer-readable medium of claim 1, the operations further comprising using the second secure connection to exchange service transactions and data between the network-based application and the network switch.

3. The non-transitory computer-readable medium of claim 1, wherein the network-based application resides on a server, and wherein the server communicates the secure authentication request to the network switch on behalf of the network-based application.

4. The non-transitory computer-readable medium of claim 1, wherein the network-based application is included in a virtual server.

5. The non-transitory computer-readable medium of claim 1, wherein the secure authentication request is a Certificate Signing Request (CSR) generated under a Secure Socket Layer protocol.

6. The non-transitory computer-readable medium of claim 5, wherein the UID is embedded in a field of the CSR.

7. The non-transitory computer-readable medium of claim 5, wherein establishing the second secure connection includes sending the provisioned certificate to the network switch during a handshaking process between the network-based application and the network switch.

8. A method comprising:
receiving, at a network switch, a secure authentication request from a network-based application via a first secure connection;
in response to the secure authentication request:
parsing, at the network switch, the secure authentication request to determine a unique identifier (UID) for the network-based application;
recording, at the network switch, the UID as being associated with the network-based application;
sending a provisioned certificate from the network switch to the network-based application via the first secure connection, the provisioned certificate including the UID;
receiving, at the network switch, a request for network services from the network-based application, the request for network services including the provisioned certificate; and
in response to receiving the request for network services, establishing a second secure connection between the network switch and the network-based application using the provisioned certificate included in the request for services.

9. The method of claim 8, further comprising associating one or more network services with the network-based application using the UID, and enabling the network-based application to access the one or more network services through the network switch.

10. The method of claim 8, wherein establishing the second secure connection comprises using a SSL/TSL protocol, wherein the provisioned certificate is transmitted during a handshaking process under the SSL/TSL protocol.

11. The method of claim 8, wherein the network-based application operates in a virtualized server platform.

12. The method of claim 8, wherein receiving the secure authentication request includes receiving a Certificate Signing Request (CSR) generated under a Secure Socket Layer protocol.

13. The method of claim 12, wherein parsing the secure authentication request includes extracting the UID from a field of the CSR, and wherein establishing the second secure connection includes sending the provisioned certificate to the network switch during a handshaking process with the network-based application.

14. A computing system comprising:
at least one processor; and
a network-based application;
wherein the network-based application is executable on the at least one processor to:
generate a unique identifier for the network-based application;
transmit a secure authentication request to a network switch via a first secure connection, wherein the unique identifier for the network-based application is embedded in the secure authentication request;
receive a provisioned certificate from the network switch via the first secure connection, wherein the provisioned certificate is provided by the network switch in response to the secure authentication request, wherein the provisioned certificate includes the unique identifier; and
establish a second secure connection between the network-based application and the network switch using the provisioned certificate.

15. The computing system of claim 14, wherein the network-based application operates as part of a virtualized server platform included in the computing system.

16. The computing system of claim 14, wherein the network-based application is to transmit a request for at least one network service to the network switch, the request including the provisioned certificate.

17. The computing system of claim 16, wherein the network-based application is to access, using the second secure connection, the at least one network service from the network switch.

18. The computing system of claim 16, wherein the network switch is store the unique identifier embedded in the secure authentication request, and is to use the stored unique identifier to determine whether to provide the at least one network service to the network-based application.

19. The computing system of claim 14, wherein the secure authentication request is a Certificate Signing Request (CSR) to the network switch, and wherein the network switch signs the provisioned certificate in response to the CSR.

20. The non-transitory computer-readable medium of claim 1, wherein establishing the second secure connection comprises transmitting a request for at least one network service to the network switch.

* * * * *